United States Patent
Sun et al.

(10) Patent No.: US 8,463,978 B2
(45) Date of Patent: Jun. 11, 2013

(54) COMPUTER WITH ABILITY TO CHARGE ELECTRONIC DEVICE IN POWER OFF STATE AND USB INTERFACE MODULE THEREOF

(75) Inventors: Zheng-Heng Sun, Tu-Cheng (TW); Lei Liu, Shenzhen (CN)

(73) Assignees: Hong Fu Jin Precision Industry (ShenZhen) Co., Ltd., Shenzhen (TW); Hon Hai Precision Industry Co., Ltd., New Taipei (TW)

( * ) Notice: Subject to any disclaimer, the term of this patent is extended or adjusted under 35 U.S.C. 154(b) by 205 days.

(21) Appl. No.: 12/960,317

(22) Filed: Dec. 3, 2010

(65) Prior Publication Data

US 2012/0089763 A1    Apr. 12, 2012

(30) Foreign Application Priority Data

Oct. 12, 2010  (CN) .................. 2010 2 0557819 U

(51) Int. Cl.
  *G06F 13/00*   (2006.01)
  *G06F 13/40*   (2006.01)
(52) U.S. Cl.
  CPC .................................. *G06F 13/4022* (2013.01)
  USPC ......................................... 710/316; 710/317

(58) Field of Classification Search
  USPC ... 710/306–317, 110, 300–304; 713/300–340
  See application file for complete search history.

(56) References Cited

U.S. PATENT DOCUMENTS

| | | | | |
|---|---|---|---|---|
| 6,256,682 | B1 * | 7/2001 | Gudan et al. | 710/14 |
| 6,625,738 | B1 * | 9/2003 | Shiga | 713/310 |
| 6,671,814 | B1 * | 12/2003 | Kubo et al. | 713/324 |
| 6,963,984 | B2 * | 11/2005 | Shiga | 713/310 |
| 7,631,200 | B2 * | 12/2009 | Niwa et al. | 713/300 |
| 8,135,892 | B2 * | 3/2012 | Moosavi | 710/106 |
| 2001/0009027 | A1 * | 7/2001 | Shiga | 713/300 |
| 2003/0172312 | A1 * | 9/2003 | Takahashi et al. | 713/300 |
| 2007/0028127 | A1 * | 2/2007 | Kim | 713/310 |
| 2008/0082842 | A1 * | 4/2008 | Minami | 713/300 |
| 2011/0016334 | A1 * | 1/2011 | Tom et al. | 713/300 |

\* cited by examiner

*Primary Examiner* — Raymond Phan
(74) *Attorney, Agent, or Firm* — Altis Law Group, Inc.

(57) ABSTRACT

A computer for charging an electronic device includes a computer, a power supply module, a motherboard and a USB interface module. The power supply module outputs electrical power when the computer is powered down. The USB interface module includes a USB interface and a switch. The USB interface is connected to the power supply and the motherboard and capable of charging the electronic device. The switch is set between the USB interface and the motherboard and controls a communication between the motherboard and the electronic device.

8 Claims, 1 Drawing Sheet

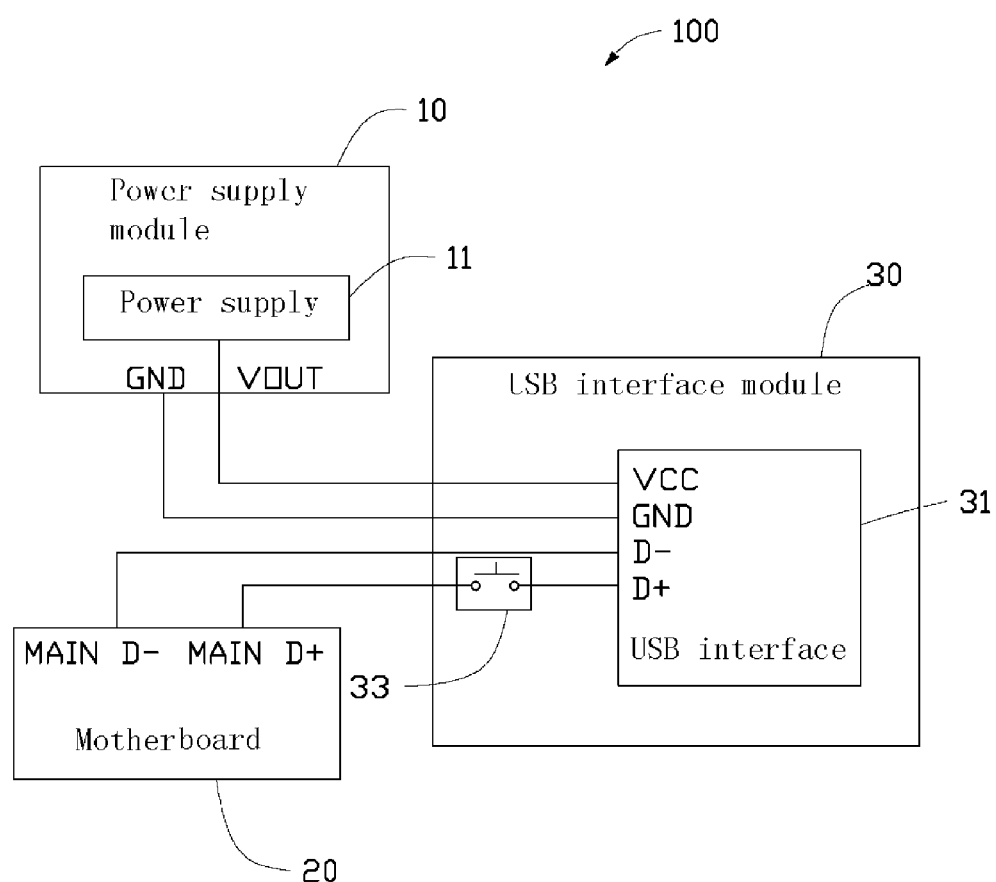

COMPUTER WITH ABILITY TO CHARGE ELECTRONIC DEVICE IN POWER OFF STATE AND USB INTERFACE MODULE THEREOF

TECHNICAL FIELD

The disclosure generally relates to computers, particularly to a computer which can charge an electronic device in a power down state.

DESCRIPTION OF RELATED ART

A computer often includes a plurality of USB interfaces exposed to the exterior thereof. Other electronic devices, such as mobile phones, can be connected to the USB interfaces by a common transmission line, and be charged by the computer. However, when the computer is powered down, the electronic devices cannot usually be charged.

In addition, when the computer is powered on from a power down state, a communication link may be automatically established between the computer and the electronic device. Virus may be transmitted there between even if the communication link is not needed.

Therefore, there is room for improvement within the art.

BRIEF DESCRIPTION OF THE DRAWINGS

Many aspects of the computer and USB interface module thereof can be better understood with reference to the following drawings. The components in the drawings are not necessarily drawn to scale, the emphasis instead being placed upon clearly illustrating the principles of the computer and USB interface module thereof.

The FIGURE is a block diagram of a computer configured for charging an electronic device in a power down state, according to an exemplary embodiment.

DETAILED DESCRIPTION

The FIGURE shows a computer 100 which can charge an electronic device in a power down state, according to an exemplary embodiment. The computer 100 includes a power supply module 10, a motherboard 20, and a USB interface module 30.

The power supply module 10 includes a power supply 11, a power output contact VOUT, and a ground contact GND. The power supply 11 is connected to the output contact VOUT and can output power by the output contact VSB when the computer 300 is in a power down state. In this exemplary embodiment, the power supply 11 may be a 5V standby power supply.

The motherboard 20 includes a pair of first data transmitting contacts MAIN D− and MAIN D+ for information transmission. The main board 20 is connected to the USB interface module 30 and can communicate with the electronic device connected to the USB interface module 30 by the pair of first data transmitting contacts MAIN D− and MAIN D+.

The USB interface module 30 includes a USB interface 31 and a switch 33. The USB interface 31 includes a power supply contact VCC, a ground contact GND, and a pair of second data transmitting contacts D− and D+. The power supply contact VCC is connected to the power output contact VOUT and get power therefrom. The ground contact GND of the USB interface is connected to the ground contact GND of the power supply 10. The second data transmitting contacts D− and D+ are connected to the pair of first data transmitting contacts MAIN D− and MAIN D+ of the motherboard 20. The switch 33 is set to toggle between one of the first data transmitting contact MAIN D+ and one of the second data transmitting contact D+. The switch 33 can be turned on/off to control the communication between the motherboard 20 and the USB interface module 30.

To charge the electronic device, the electronic device can be connected to the power supply 11 by the USB interface 31. The power supply 11 can output power to the electronic device even when the computer 100 is powered down, therefore the electronic device can be charged thereby.

In addition, the switch 33 can be turned off. When the computer 100 is powered on from the power down state, the computer 100 cannot communicate with the electronic device. Virus cannot be transmitted therebetween. Therefore, the electronic device can be charged in a safe state.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A computer, comprising:
a power supply module;
a motherboard comprising a pair of first data transmitting contacts; and
a USB interface module; comprising
a USB interface connected to the power supply module and the motherboard, and configured to charge an electronic device connected to the USB interface, by the power supply module, the USB interface comprising a pair of second data transmitting contacts corresponding to the pair of first data transmitting contacts; and
a switch, a first end of the switch electrically connected to one of the first transmitting contacts, a second end of the switch electrically connected to one of the second transmitting contacts, the switch controlling communication between the motherboard and the electronic device.

2. The computer as claimed in claim 1, wherein when the switch is turned off, the motherboard cannot communicate with the electronic device.

3. The computer as claimed in claim 1, wherein the USB interface further includes a power supply contact and a ground contact connected to the power supply module.

4. The computer as claimed in claim 3, wherein the power supply module includes a power supply.

5. A USB interface module; comprising:
a USB interface connecting to a power supply and a motherboard of a computer, the motherboard comprising a pair of first data transmitting contacts, the USB interface used to receive and charge an electronic device connected to the USB interface, the USB interface comprising a pair of second data transmitting contacts corresponding to the pair of first data transmitting contacts; and
a switch, a first end of the switch electrically connected to one of the first transmitting contacts, a second end of the switch electrically connected to one of the second transmitting contacts, the switch controlling communication between the motherboard and the electronic device.

6. The USB interface module as claimed in claim 5, wherein when the switch is turned off, the motherboard cannot communicate with the electronic device.

7. A computer, comprising:
a power supply module comprising:
   a power output contact; and
   a ground contact;
   a power supply electrically connected to the power output contact and outputting power by the power output contact when the computer is powered off;
a motherboard comprising a pair of first data transmitting contacts; and
a USB interface module; comprising:
   a USB interface configured to connect to an electronic device, comprising:
     a power supply contact connected to the power output contact and charging the electronic device;
     a ground contact connected to the ground contact of the power supply; and
     a pair of second data transmitting contacts corresponding to the pair of first data transmitting contacts; and
   a switch, a first end of the switch electrically connected to one of the first transmitting contacts, a second end of the switch electrically connected to one of the second transmitting contacts, the switch controlling communication between the motherboard and the electronic device.

8. The USB interface module as claimed in claim 7, wherein when the switch is turned off and the computer is powered on, one of the pair of first data transmitting contacts is disconnected from one of the pair of second data transmitting contacts.

* * * * *